L. S. OLLIS.
FLEXIBLE STAY BOLT FOR BOILERS.
APPLICATION FILED OCT. 8, 1915.
1,179,136. Patented Apr. 11, 1916.
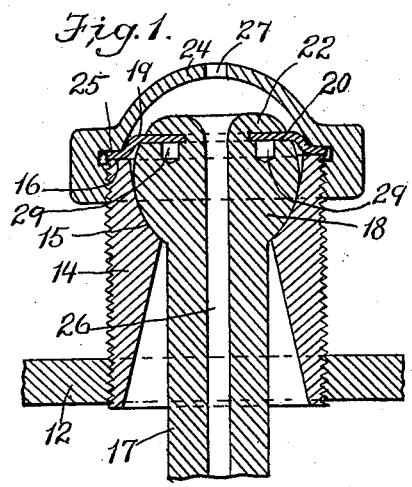
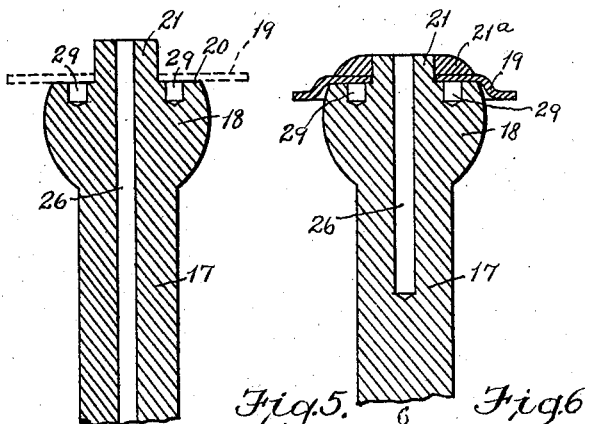
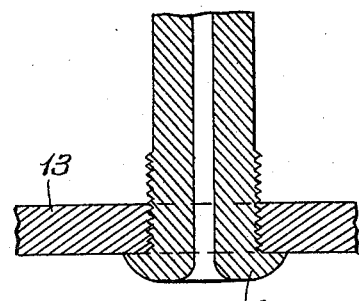
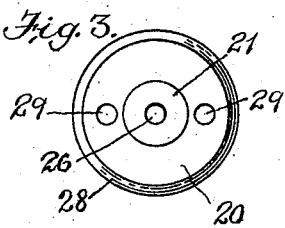
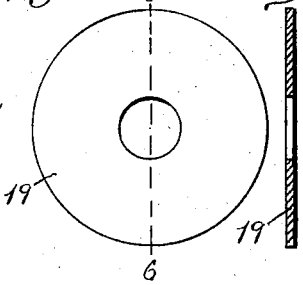
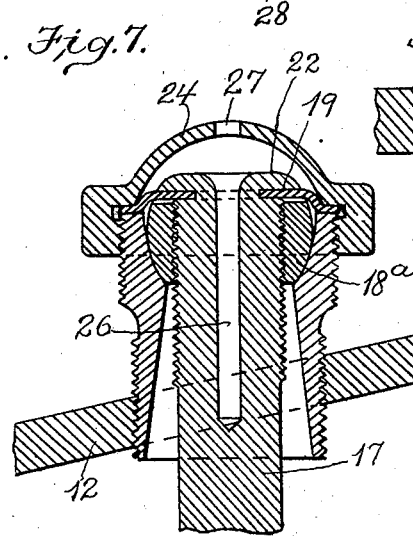
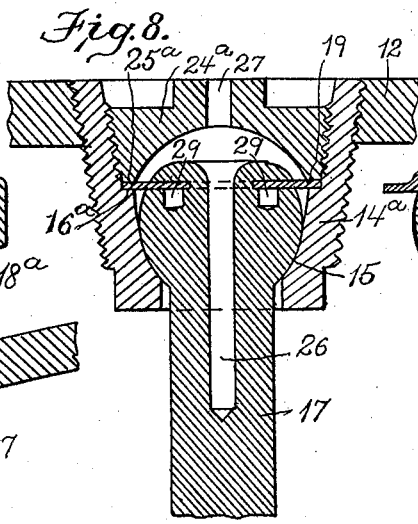
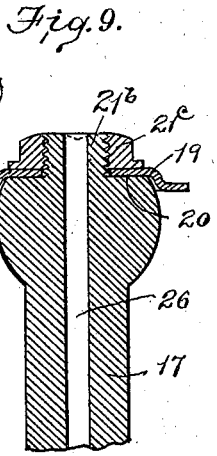
Inventor:
Luke S. Ollis

UNITED STATES PATENT OFFICE.

LUKE S. OLLIS, OF KEENE, NEW HAMPSHIRE.

FLEXIBLE STAY-BOLT FOR BOILERS.

1,179,136.  Specification of Letters Patent.  Patented Apr. 11, 1916.

Application filed October 8, 1915. Serial No. 54,734.

*To all whom it may concern:*

Be it known that I, LUKE S. OLLIS, a citizen of the United States, and a resident of Keene, in the county of Cheshire and State of New Hampshire, have invented certain new and useful Improvements in Flexible Stay-Bolts for Boilers, of which the following is a specification.

This invention relates to flexible stay bolts employed to connect the opposite sheets of steam boilers and having a flexible connection with one of said sheets, the bolt being provided with a tell-tale passage through which steam escapes when the bolt is cracked or broken.

The object of the invention is to provide improved means for maintaining steam-tight joints at the outer end or head of the bolt so that steam cannot escape while the bolt is intact.

The invention is embodied in the improvements hereinafter described and claimed.

Of the accompanying drawings forming a part of this specification: Figure 1 represents a view in section of two sections of the outside and fire-box sheets of the boiler, the stay bolt structure of my invention being shown in section; Fig. 2 represents a sectional view representing a portion of the bolt shown by Fig. 1 before the diaphragm, hereinafter described, is engaged therewith; Fig. 3 represents an end view of the bolt as shown by Fig. 2; Fig. 4 represents a sectional view of a portion of the bolt, showing a modification; Fig. 5 represents a side view of the diaphragm; Fig. 6 represents a section on the line 6—6 of Fig. 5; Fig. 7 represents a view similar to a portion of Fig. 1, showing another modification; Fig. 8 represents a view similar to a portion of Fig. 1, showing another modification; Fig. 9 represents a view similar to a portion of Fig. 4, showing another modification.

The same reference characters indicate the same parts wherever they occur.

In the drawings, 12 represents the outside sheet and 13 the fire-box sheet of a boiler.

14 represents an externally threaded sleeve engaged with a tapped orifice in the outside sheet 12 and provided in its outer portion with a rounded socket 15. The outer end of the sleeve forms an annular inner clamping face 16, the function of which will be presently described.

17 represents a stay bolt having at its outer end a rounded head 18 seated on the wall of the socket 15 and adapted to turn or rock slightly thereon.

19 represents an annular flexible diaphragm of suitable ductile metal such as copper. The inner marginal portion of the diaphragm has a steam-tight engagement with the outer portion of the bolt head 18, the outer marginal portion of the diaphragm projecting outwardly from and surrounding the bolt head and overlapping the inner clamping face 16. I prefer to connect the diaphragm with the bolt head as follows: On the bolt head is formed an annular diaphragm seat 20 from which projects a reduced portion 21 of the bolt, said portion being concentric with and surrounded by the seat 20. The diaphragm 19 is first placed upon the reduced portion 21 and seat 20, as indicated by dotted lines in Fig. 2. The outer end of the reduced portion is then spread or upset by a suitable tool against the outer surface of the inner marginal portion of the diaphragm, thus forming a flange 22 which is pressed closely against the diaphragm and presses the diaphragm closely against the seat 20, said flange and seat coöperating in forming a steam-tight joint at the inner marginal portion of the diaphragm. Instead of forming the flange by upsetting the outer end of the reduced portion 21, I may leave said reduced portion in its original form, and, by an acetylene torch or other suitable apparatus, form from molten metal a flange 21ª (Fig. 4) which is molecularly welded to the reduced portion 21 and the diaphragm 19. The diaphragm may be slightly cupped, as indicated by Figs. 1, 4 and 7, to offset its outer marginal portion from its inner marginal portion.

24 represents a cap having an internally threaded flange engaged with the external thread of the sleeve 14. Said cap is provided internally with an annular outer clamping face 25 which is opposed to the inner clamping face 16 and is caused by the operation of screwing the cap upon the sleeve to coöperate with the inner clamping face in clamping the outer marginal portion of the diaphragm and forming a steam-tight joint thereat.

The bolt 17 and cap 24 are provided with tell-tale passages numbered respectively 26 and 27, said passages permitting the escape of steam in case the bolt is broken or fractured. The inner marginal portion of the diaphragm, engaged as described with the bolt, and the outer marginal portion of the diaphragm, clamped as described between the sleeve and cap, are separated by an intermediate flexible zone of the diaphragm, said zone permitting the movements of the bolt provided for by the ball and socket construction above described, and at the same time preventing the escape of steam between the head 18 and the wall of the socket 15. It will be seen, therefore, that so long as the bolt is intact, there can be no escape of steam, and that, when the bolt is broken, the fact will be instantly indicated by the escape of steam through the cap 24. The passage 26 in the bolt may extend partly through the bolt, as shown in Figs. 4, 7 and 8, or entirely through the bolt, as shown in Fig. 1.

The inner end of the bolt may be engaged with the sheet 13 in any suitable way, said inner end being preferably screw-threaded and engaged with a tapped orifice in the sheet 13 and subsequently upset to form a flange or head 28. To enable the threaded inner end of the bolt to be screwed into the sheet 13, I provide holes or sockets 29 extending inwardly from the seat 20 and adapted to engage a spanner, whereby the bolt may be rotated.

Fig. 7 shows a construction which differs from Fig. 1 in that the rounded head of the bolt is formed by a sleeve or ring 18$^a$ internally threaded and engaged with an external thread on the bolt.

Fig. 8 shows a stay bolt structure in which the outer end of the sleeve 14$^a$ is flush with the boiler sheet 12, the inner clamping face 16$^a$ being between the ends of the sleeve, and the cap 24$^a$ having the outer clamping face 25$^a$, being externally screw-threaded and engaged with an internal thread in the sleeve.

Fig. 9 shows the bolt provided with a reduced portion 21$^b$, which is screw-threaded and engaged by a nut 21$^c$, which is the equivalent of the flange 22 or the flange 21$^a$ as the means for clamping the diaphragm against the seat 20. The bolt may be rotated to engage it with the sheet 13 by a wrench applied to the nut 21$^c$. This construction enables the diaphragm to be operatively secured to the bolt before the bolt is inserted in the boiler. The bolt equipped with the diaphragm adapted to coöperate with clamping means on a boiler sheet constitutes a new and useful article of manufacture.

I claim:—

1. A stay bolt structure comprising an externally threaded sleeve provided internally with a rounded socket and with an annular inner clamping face surrounding said socket, a stay bolt having a rounded head seated on said socket, an annular flexible diaphragm of ductile metal the inner marginal portion of which has a steam-tight engagement with the stay bolt, the outer marginal portion of said diaphragm overlapping the said inner clamping face, and a cap having a screw thread engagement with the sleeve and provided with an annular outer clamping face adapted to coöperate with the said inner clamping face in clamping the outer marginal portion of the diaphragm and forming a steam-tight joint thereat, the diaphragm having an unconfined flexible zone between its inner and outer marginal portions conforming to movements of the bolt and preventing the escape of steam when the bolt is intact, the said bolt and cap being provided with tell-tale steam passages through which steam escapes only when the bolt is broken.

2. A stay bolt structure comprising an externally threaded sleeve provided internally with a rounded socket and with an annular inner clamping face surrounding said socket, a stay bolt having a rounded head seated on said socket, an annular diaphragm seat, and a reduced central portion surrounded by and projecting outwardly from said seat, an annular flexible diaphragm of ductile metal bearing at its inner marginal portion on said seat, said reduced portion being provided with an annular flange coöperating with said seat in forming a steam-tight joint between the said inner marginal portion and the bolt, the outer marginal portion of said diaphragm overlapping the said inner clamping face, and a cap having a screw thread engagement with the sleeve and provided with an annular outer clamping face adapted to coöperate with the said inner clamping face in clamping the outer marginal portion of the diaphragm.

3. A stay bolt structure comprising an externally threaded sleeve provided internally with a rounded socket and with an annular inner clamping face surrounding said socket, a stay bolt having a rounded head seated on said socket, an annular diaphragm seat, and a reduced central portion surrounded by and projecting outwardly from said seat, an annular flexible diaphragm of ductile metal bearing at its inner marginal portion on said seat, said reduced portion being elongated and upset over the inner marginal portion of the diaphragm to form an annular flange coöperating with said seat in forming a steam-tight joint between the said inner marginal portion and the bolt, the outer marginal portion of said diaphragm overlapping the said inner clamping face, and a cap having a screw thread engagement with the sleeve and provided with an annular outer clamping face adapted to coöperate with the said inner clamping face in clamping the outer marginal portion of the diaphragm.

4. As an article of manufacture, a stay bolt having a rounded head formed to be seated on a rounded socket in a fixed sleeve, and a flexible annular diaphragm the inner marginal portion of which has a steam-tight engagement with the outer portion of said head, the outer marginal portion of the diaphragm projecting outwardly from and surrounding the head for coöperation with clamping means on a boiler sheet.

5. As an article of manufacture, a stay bolt having a rounded head formed to be seated on a rounded socket in a fixed sleeve and provided at its outer portion with an annular diaphragm seat and with a reduced central portion surrounded by and projecting outwardly from said seat, an annular flexible diaphragm of ductile metal bearing at its inner marginal portion on said seat, said reduced portion being provided with an annular flange coöperating with said seat in forming a steam-tight joint, the outer marginal portion of the diaphragm projecting outwardly from and surrounding the head for coöperation with clamping means on a boiler sheet.

6. As an article of manufacture, a stay bolt having a rounded head formed to be seated on a rounded socket in a fixed sleeve and provided at its outer portion with an annular diaphragm seat and with a reduced central portion surrounded by and projecting outwardly from said seat, an annular flexible diaphragm of ductile metal bearing at its inner marginal portion on said seat, said reduced portion being elongated and upset over the inner marginal portion of the diaphragm to form an annular flange coöperating with said seat in forming a steam-tight joint, the outer marginal portion of the diaphragm projecting outwardly from and surrounding the head for coöperation with clamping means on a boiler sheet.

7. As an article of manufacture, a stay bolt having a rounded head formed to be seated on a rounded socket in a fixed sleeve and provided at its outer portion with an annular diaphragm seat in which are formed spanner-engaging sockets, and with a reduced central portion surrounded by and projecting outwardly from said seat, an annular flexible diaphragm of ductile metal bearing at its inner marginal portion on said seat, said reduced portion being provided with an annular flange coöperationg with said seat in forming a steam-tight joint, the outer marginal portion of the diaphragm projecting outwardly from and surrounding the head for coöperation with clamping means on a boiler sheet.

In testimony whereof I have affixed my signature.

LUKE S. OLLIS.

Copies of this patent may be obtained for five cents each, by addressing the "Commissioner of Patents, Washington, D. C."